UNITED STATES PATENT OFFICE 2,676,983

PROCESS FOR PREPARING MONOCHLORO-DIFLUORO ACETYL FLUORIDE

Victor R. Hurka, Westhaven, Del., assignor to E. I. du Pont de Nemours & Company, Wilmington, Del., a corporation of Delaware No Drawing. Application February 8, 1952, Serial No. 270,745

2 Claims. (Cl. 260—544)

This invention relates to monochlorodifluoro acetyl fluoride and to a novel process for making it.

It is known that some acid halides may be prepared by the oxidation of halogen substituted olefines by oxygen in the presence of catalytic agents at temperatures up to about 80° C. for periods of from about 20 hours to about 120 hours. All such processes require the presence of catalytic agents, such as actinic light or chlorine, and usually require both light and chlorine for best results. Such processes are illustrated by Patents 2,439,505 and 2,456,768 granted to David W. Chaney.

It is an object of my invention to produce monochlorodifluoro acetyl fluoride which is a new chemical compound having valuable properties particularly for use as an intermediate in the preparation of other valuable compounds. Another object is to provide a novel process for the preparation of monochlorodifluoro acetyl fluoride. A further object is to provide a process for producing monochlorodifluoro acetyl fluoride in a simple and safe manner. Still further objects are to provide a new composition of matter and to advance the art. Still other objects will appear hereinafter.

The above and other objects may be accomplished in accordance with my invention which comprises oxidizing 1,1,2-trifluoro-2-chloroethylene, $CF_2=CFCl$, with oxygen in the absence of a catalytic agent at a temperature of from about 25° C. to about 50° C. and under a pressure of from about 100 to about 300 pounds per square inch gauge. By such process, monochlorodifluoro acetyl fluoride is produced in good yields in a simple and safe manner.

Monochlorodifluoro acetyl fluoride has the formula $CF_2ClCOF$ and boils at —18.5° C. It can be handled readily as a gas and can be employed in reactions in the gaseous state. It can be liquefied with a reasonable degree of refrigeration, if desired, and readily handled and used in reactions as a liquid. Its boiling point is quite advantageous in many cases, particularly when it is used as a reagent, because any unreacted material can be easily removed from the reaction mixture by volatilization. It is a valuable intermediate for the preparation of monochlorodifluoro acetic amides and esters, to which it is readily converted by treatment with the appropriate amine or alcohol. Also, it hydrolyzes readily with water to give the valuable monochlorodifluoro acetic acid, thus providing a new synthetic route to such valuable acid.

While the oxidation of $CF_2=CFCl$ to monochlorodifluoro acetyl fluoride can be carried out in a simple manner, it is essential that the conditions be carefully controlled. Ordinarily, the $CF_2=CFCl$ will be placed in a vessel capable of withstanding several hundred pounds pressure, such as an autoclave, which has provision for agitation and cooling because the reaction is exothermic. Oxygen is then forced into the vessel to a pressure of from about 100 to about 300 pounds per square inch gauge while the contents are agitated and the temperature is held at from about 25° C. to about 50° C. Usually, the $CF_2=CFCl$ will be at a temperature below 25° C. and frequently below its boiling point (—27.9° C.), and heating will be applied to the vessel to bring the material up to the desired reaction temperature to start the reaction, and then cooling will be applied to the vessel, as by circulating a cooling fluid over its outer surface, to maintain the temperature in the vessel within the desired range. When the absorption of oxygen ceases, as shown by the failure of the pressure to drop further, the reaction is complete. Then the contents of the vessel are withdrawn through a condenser cooled to about —70° C. to about —80° C., whereupon the crude product is condensed and collected as a liquid. Unreacted $CF_2=CFCl$ and any side reaction products are separated from the monochlorodifluoro acetyl fluoride by fractional distillation.

The proportion of oxygen employed is not critical, but should be at least 0.5 molar proportion. Usually, a considerable excess of oxygen is employed so as to ensure maximum contact of the $CF_2=CFCl$ therewith with optimum yields in a minimum of time. The maximum amount of oxygen is limited solely by considerations of convenience and economy. The total amount of oxygen may be added all at once, but, preferably, is added continuously to the vessel as rapidly as it is used up in the reaction and so as to maintain the desired pressure or is added in increments so that the pressure is built up to a desired high level and then allowed to fall to a desired lower level before each additional increment is added.

It is known that light and chlorine catalyze the oxidation of olefinic compounds. While catalytic agents, such as light and chlorine, have been required heretofore in such oxidations, I have found that such oxidizing agents cannot be used in my process, but must be carefully excluded therefrom. When it has been attempted to oxidize $CF_2=CFCl$ in the presence of catalytic agents, such as light, chlorine, tertiary butyl hypochlorite and combinations thereof, a violent uncontrollable reaction takes place with incandescence or burning and the production of carbon, halogenated methanes and phosgenes without the production of the desired monochlorodifluoro acetyl fluoride.

Such violent uncontrollable reaction also takes place at high temperature and pressures. Accordingly, in order to carry out the process safely and successfully without difficulty, the temperature and pressures should not materially exceed 50° C. and 300 pounds per square inch gauge.

In order to more clearly illustrate my invention, preferred modes of carrying the same into effect and the advantageous results to be obtained thereby, the following examples are given:

*Example I*

Into a pressure vessel, equipped for agitation and cooling externally with water, was put 106 parts by weight of monochlorotrifluoroethylene, $CF_2=CFCl$. The autogenous pressure was 70 lbs. per square inch gauge at 25° C. Oxygen from a cylinder was then passed into the vessel until a pressure of 125 lbs. per square inch gauge was attained. The oxygen flow was turned off. Agitation was then commenced. The temperature of the reaction mass increased gradually from an initial point of 25° C. to 46° C. after 3 hours, and then fell to 37° C. after a further 3 hours. The pressure increased to 190 lbs. at the end of 35 minutes and then fell gradually to 110 lbs. at the end of 6 hours.

The gaseous contents of the vessel were released slowly through a valve and passed to a refrigerated condenser and collected at a temperature of $-70°$ C. to $-75°$ C. The residual gas in the vessel was collected in a trap surrounded by liquid nitrogen by evacuating the vessel to about 1 mm. absolute pressure. A total of 92 parts by weight was thus collected.

The product was fractionally distilled to obtain the product, $CF_2ClCOF$, which boiled at $-18.5°$ C. The yield was approximately 43%. The product was characterized by converting it to the amide by dissolving it in ether and passing gaseous ammonia into the solution. The amide was recovered from the ether as a white crystalline solid and showed the following analysis as compared to theoretical for $CF_2ClCONH_2$.

|  | Found | Calculated |
|---|---|---|
|  | *Percent* | *Percent* |
| C | 18.33 | 18.55 |
| H | 1.55 | 1.70 |
| N | 10.74 | 10.82 |
| Cl | 26.54 | 27.4 |
| F | 28.15 | 29.40 |

*Example II*

In another experiment in the same equipment, 93 parts by weight of $CF_2=CFCl$ were put into the vessel and oxygen was added in small increments over 22 hours (the elapsed time was 67 hours counting idle overnight periods) until a final pressure of 272 lbs. per square inch gauge had been attained. The temperature was held at 27–37° C. during this time. The gaseous contents of the vessel were discharged into cold traps and totaled 93 parts by weight. Analysis by infrared absorption spectra showed the presence of 50.8% $CF_2ClCOF$.

It will be understood that the preceding examples have been given merely for purposes of illustration and that my invention is not limited to the specific embodiments disclosed therein. It will be apparent to those skilled in the art that variations can be made in the conditions and proportions employed, within the limits hereinbefore set forth, and in the equipment without departing from the spirit or scope of my invention.

From the preceding description, it will be apparent that, by my invention, I have provided a valuable new compound, monochlorodifluoro acetyl fluoride, and a novel, simple and effective method for preparing such compound. Accordingly, it will be apparent that my invention constitutes a valuable contribution to and an important advance in the art.

I claim:

1. The process which comprises oxidizing $$CF_2=CFCl$$

with oxygen in the absence of a catalytic agent at a temperature of from about 25° C. to about 50° C. and under a pressure of from about 100 to about 300 pounds per square inch gauge, and then separating monochlorodifluoro acetyl fluoride from the reaction mixture.

2. The process for preparing monochlorodifluoro acetyl fluoride which comprises placing $CF_2=CFCl$ in a pressure vessel, adding at least 0.5 molar proportion of oxygen at a pressure of from about 100 to about 300 pounds per square inch gauge, heating the mixture with agitation to a temperature of from about 25° C. to about 50° C., maintaining the temperature within the range of from about 25° C. to about 50° C. and the pressure within the range of from about 100 to about 300 pounds per square inch gauge until the absorption of oxygen by the $CF_2=CFCl$ ceases, excluding light and other catalytic agents from the reacting materials throughout such process, and then recovering the reaction products.

References Cited in the file of this patent

UNITED STATES PATENTS

| Number | Name | Date |
|---|---|---|
| 1,976,265 | Mugdan et al. | Oct. 9, 1934 |
| 2,062,743 | Daudt et al. | Dec. 1, 1936 |
| 2,257,868 | Tinker | Oct. 7, 1941 |
| 2,378,048 | Theobald | June 12, 1945 |
| 2,480,467 | Haworth | Aug. 30, 1949 |
| 2,567,011 | Diesslin et al. | Sept. 4, 1951 |

OTHER REFERENCES

Beilstein, vol. 2, page 206.